(12) United States Patent
Hall et al.

(10) Patent No.: US 7,067,092 B2
(45) Date of Patent: Jun. 27, 2006

(54) TREATMENT OF GASEOUS EMISSIONS

(75) Inventors: Stephen Ivor Hall, Oxford (GB); David Raybone, Stow-on-the-Wold (GB); Fiona Winterbottom, Reading (GB); David Leslie Segal, Abingdon (GB); James Timothy Shawcross, Charlbury (GB); Ross Alexander Morgan, Oxford (GB); Anthony Robert Martin, Abingdon (GB); Michael Inman, Abingdon (GB)

(73) Assignee: Accentus PLC, Didcot (GB)

( * ) Notice: Subject to any disclaimer, the term of this patent is extended or adjusted under 35 U.S.C. 154(b) by 113 days.

(21) Appl. No.: 10/694,827

(22) Filed: Oct. 29, 2003

(65) Prior Publication Data

US 2004/0219084 A1 Nov. 4, 2004

Related U.S. Application Data

(63) Continuation of application No. 09/485,566, filed as application No. PCT/GB98/02569 on Aug. 26, 1998, now abandoned.

(30) Foreign Application Priority Data

| Sep. 9, 1997 | (GB) | 9718971.6 |
| Dec. 19, 1997 | (GB) | 9726713.2 |
| Dec. 19, 1997 | (GB) | 9726714.0 |

(51) Int. Cl.
*C01B 21/00* (2006.01)

(52) U.S. Cl. ............... 423/239.1; 423/235; 422/169
(58) Field of Classification Search ............... 423/235, 423/239.1; 422/169, 174, 186, 186.04
See application file for complete search history.

(56) References Cited

U.S. PATENT DOCUMENTS

| 3,983,021 A | 9/1976 | Henis ........................ 204/164 |
| 4,276,066 A | 6/1981 | Bly ............................. 55/287 |
| 4,427,418 A | 1/1984 | Kogiso ........................ 55/287 |
| 4,485,622 A | 12/1984 | Takagi ........................ 60/296 |
| 4,505,107 A | 3/1985 | Yamaguchi ................... 60/303 |
| 4,954,320 A | 9/1990 | Birmingham ........... 422/186.04 |
| 5,147,516 A | 9/1992 | Mathur ........................ 204/177 |
| 5,149,511 A | 9/1992 | Montreuil ................... 423/212 |
| 5,194,078 A * | 3/1993 | Yonemura et al. ............. 55/466 |
| 5,284,556 A | 2/1994 | Rich ........................ 204/164 |
| 5,427,747 A * | 6/1995 | Kong et al. .................. 422/186 |
| 5,609,736 A | 3/1997 | Yamamoto ................... 204/164 |
| 5,711,147 A | 1/1998 | Vogtlin ........................ 60/274 |
| 5,715,677 A | 2/1998 | Wallman ...................... 60/274 |
| 5,746,984 A * | 5/1998 | Hoard ........................ 422/169 |
| 5,843,288 A * | 12/1998 | Yamamoto ................... 204/164 |
| 5,942,195 A * | 8/1999 | Lecea et al. ................. 422/174 |
| 6,136,278 A * | 10/2000 | Eliasson et al. ........ 422/186.04 |
| 6,176,078 B1 * | 1/2001 | Balko et al. .................. 60/274 |
| 6,238,525 B1 * | 5/2001 | Lox et al. .................... 204/177 |

FOREIGN PATENT DOCUMENTS

| DE | 195 10 804 | 9/1996 |
| EP | 0 010 384 | 4/1980 |
| EP | 0 112 634 | 7/1984 |
| EP | 0 244 061 | 11/1987 |
| EP | 0 659 465 | 6/1995 |
| FR | 0 132 166 | 1/1985 |
| GB | 2 274 412 | 7/1994 |
| JP | 6-106025 | 4/1994 |
| WO | 92/19361 | 11/1992 |
| WO | 98/09699 | 3/1998 |

OTHER PUBLICATIONS

M. Shelef, "Selective Catalytic Reduction of $NO_x$ with N-Free Reductants," Chem. Rev., 1995, vol. 95, pp. 209-225.

* cited by examiner

*Primary Examiner*—Edward M. Johnson
(74) *Attorney, Agent, or Firm*—William H. Holt

(57) ABSTRACT

A reactor chamber forms part of an exhaust system of an internal combustion engine. Within the chamber are electrodes between which there is disposed a bed of active material through which, in use, the exhaust gases pass. In the presence of an electrical discharge, driven by an electrical voltage applied across the electrodes, the active material has a catalytic action in the reduction of nitrogenous oxides in the exhaust and also acts to remove hydrocarbons from the exhaust gases.

4 Claims, 6 Drawing Sheets

TREATMENT OF GASEOUS EMISSIONS

Figure 1:
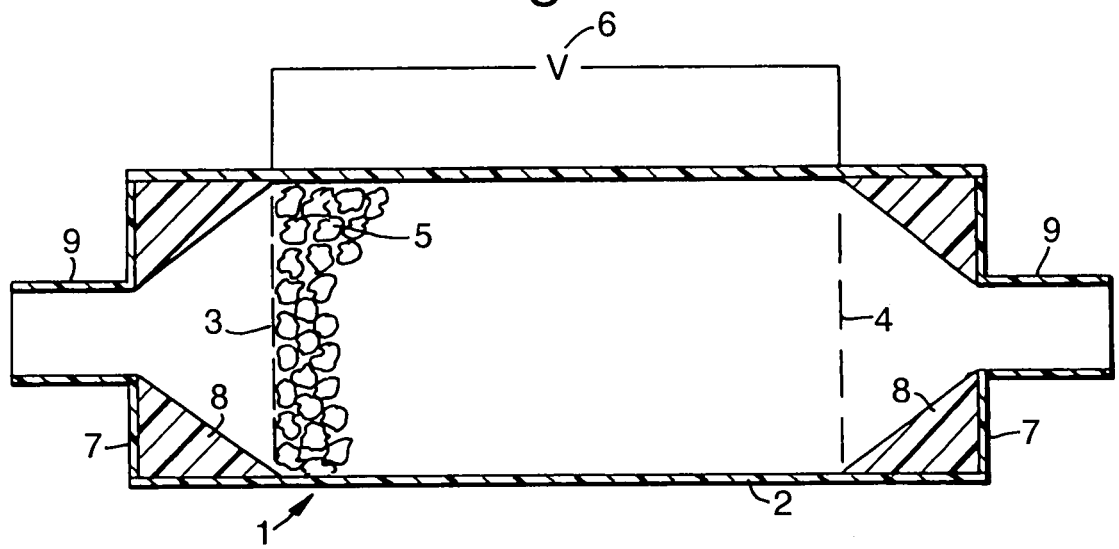

This is a continuation of application Ser. No. 09/485,566 filed Feb. 14, 2000 now abandoned which is a 371 of PCT/GB98/02569 filed on Aug. 26, 1998.

The present invention relates to the treatment of gaseous emissions and in particular to the reduction of the emission of nitrogenous oxides (HCs for Gasoline) from the exhausts of internal combustion engines.

One of the major problems associated with the development and use of internal combustion engines is the noxious exhaust emissions from such engines. Two of the most deleterious materials, particularly in the case of diesel engines, are particulate matter (primarily carbon) and oxides of nitrogen ($NO_x$). Excessive levels of $NO_x$ also are produced by spark-ignition engines operating in what is known as 'lean burn' mode in which the air/fuel ratio is higher than that required for stoichiometric combustion. Increasingly severe emission control regulations are forcing internal combustion engine and vehicle manufacturers to find more efficient ways of removing these materials in particular from internal combustion engine exhaust emissions. Unfortunately, in practice, it is found that techniques which improve the situation in relation to one of the above components of internal combustion engine exhaust emissions tend to worsen the situation in relation to the other. Even so, a variety of systems for trapping particulate emissions from internal combustion engine exhausts have been investigated, particularly in relation to making such particulate emission traps capable of being regenerated when they have become saturated with particulate material.

Examples of such diesel exhaust particulate filters are to be found in European patent application EP 0 010 384; U.S. Pat. Nos. 4,505,107; 4,485,622; 4,427,418; and 4,276,066; EP 0 244 061; EP 0 112 634 and EP 0 132 166.

In all the above cases, the particulate matter is removed from diesel exhaust gases by a simple, physical trapping of particulate matter in the interstices of a porous, usually ceramic, filter body, which is then regenerated by heating the filter body to a temperature at which the trapped diesel exhaust particulates are burnt off. In most cases the filter body is monolithic, although EP 0 010 384 does mention the use of ceramic beads, wire meshes or metal screens as well. U.S. Pat. No. 4,427,418 discloses the use of ceramic coated wire or ceramic fibres.

In a broader context, the precipitation of charged particulate matter by electrostatic forces also is known. However, in this case, precipitation usually takes place upon large planar electrodes or metal screens.

GB patent 2,274,412 discloses a method and apparatus for removing particulate and other pollutants from internal combustion engine exhaust gases, in which the exhaust gases are passed through a bed of charged pellets of material, preferably ferroelectric, having high dielectric constant. In addition to removing particulates by oxidation, especially electric discharge assisted oxidation, there is disclosed the reduction of $NO_x$ gases to nitrogen, by the use of pellets adapted to catalyse the $NO_x$ reduction.

Also, U.S. Pat. Nos. 3,983,021, 5,147,516 and 5,284,556 disclose the catalytic reduction of nitrogen oxides. However, U.S. Pat. No. 3,983,021 is solely concerned with the reduction of NO to N in a silent glow discharge, the temperature of which is kept below a value of at which the oxidation of N or NO to higher oxides of nitrogen does not occur. There is no mention of any simultaneous removal of hydrocarbons.

Although, so-called contact bodies are used in the process of U.S. Pat. No. 3,983,021, and some of those disclosed may have some catalytic properties, catalysis does not appear to be a necessary feature of the process of U.S. Pat. No. 3,983,021. Other surface properties, such as adsorption on large surface area materials, are the basis of the process of U.S. Pat. No. 3,983,021.

U.S. Pat. No. 5,147,516 does refer to the use of catalysts to remove $NO_x$, but the catalytic materials involved are defined very specifically as being sulphur tolerant and deriving their catalytic activity from their form rather than their surface properties.

Also, the operating conditions are very tightly defined. There is no specific mention of the type, if any, of electric discharge involved. All that is disclosed is that the $NO_x$ removal depends upon electron-molecule interactions, facilitated by the structure of the 'corona-catalytic' materials, not the inter-molecular interactions involved in the present invention. There is no mention of the simultaneous removal of hydrocarbons from the gas streams being treated by the invention of U.S. Pat. No. 5,147,516.

U.S. Pat. No. 5 284 556 does disclose the removal of hydrocarbons from internal combustion engine exhaust emissions. However, the process involved is purely one of dissociation in an electrical discharge of the so-called 'silent' type, that is to say, a discharge which occurs between two electrodes at least one of which is insulated. The device described is an open discharge chamber, not a packed bed device. Mention is made of the possible deposition of a $NO_x$-reducing catalyst on one of the electrodes.

U.S. Pat. No. 5,609,736 discloses a pellet bed reactor in which the pellets of the reactor bed either incorporate a catalyst or are mixed with separate (smaller) pellets of a material which is catalytic for the disruption of volatile organic compounds. The catalysts also are chosen with a view to reduce the production of carbon monoxide as a by-product of the disruption of the volatile organic compounds. The only volatile organic compound dealt with in the text of the specification is carbon tetrachloride. Nowhere in U.S. Pat. No. 5,609,736 is there any method demonstrated for the treatment of nitrogen or its compounds.

U.S. Pat. No. 5,149,511 discloses a system for reducing $NO_x$ emissions from oxygen-rich internal combustion engine exhaust gases in which partially oxygenated light organic compounds such as alcohols, aldehydes, ketones and ethers, are injected into the exhaust gases which are then passed over a bed of a copper-containing ZSM5 zeolite and then a bed of an oxidising catalyst such as Pt doped alumina or 1% Pd/10% $La_2O_3/Al_2O_3$.

Although the partially oxygenated organic compound is described as a reductant, presumably in combination with the zeolite catalyst, no information is given as to the chemistry involved, neither is there given any explanation of the role of the oxidation catalyst, nor as to why it should be downstream of the reducing stage. Furthermore, no plasma enhancement is involved, the only energy input seems to be the thermal energy of the exhaust gases.

U.S. Pat. No. 5,711,147, published after the priority date of this application, discloses a plasma-assisted catalytic reactor to reduce the emission by internal combustion engines of NO and, possibly, carbonaceous particulates. The system is for use with oxygen-rich exhaust gases from diesel and lean-burn spark ignition engines.

In the system described a hydrocarbon such as diesel fuel is cracked into simpler hydrocarbons by a corona discharge and mixed with oxygen-rich exhaust gases from which $NO_x$ is to be removed. The mixed hydrocarbons and exhaust gases are then passed through another region of corona discharge, which may include silica beads as a particulate trap. In this region, $NO_x$ is oxidised to $NO_2$. The $NO_2$ plus excess hydrocarbons are passed through a bed of a catalyst which acts to reduce the $NO_2$ to $O_2$ and $N_2$ and to oxidise the hydrocarbons to $CO_2$ and $H_2O$. No plasma is involved. The effluent from the catalyst bed is passed through a second bed of an oxidising catalyst which oxidises remaining hydrocarbons to $CO_2$ and $H_2O$.

The use of corona discharges as the plasma source has the disadvantage that such discharges can only be successfully established over limited distances between the discharge electrodes, so that the dimensions of the plasma processing regions, and hence the throughput of exhaust gas, correspondingly is limited. Pulsed corona sources can be used to overcome some of the disadvantages but when reduced to practice they are inhibited by the cost, complexity, durability and electromagnetic emissions associated with short pulse, high voltage power supplies. The actual $NO_2$ reduction and hydrocarbon oxidation take place without the assistance of plasmas.

U.S. Pat. No. 5,715,677, published after the priority date of this application discloses a system for reducing $NO_x$ and particulate emissions from diesel exhausts using plasma-regenerated absorbent beds.

Two beds are used, one of which absorbs $NO_x$ and particulates and the other of which reduces $NO_x$ and oxidises carbonaceous particulates using a plasma in combination with the catalytic properties of the absorber beds. The beds are used alternately.

However, the plasma seems to be used solely to heat the catalyst bed to a temperature in the range 300–9000° C. and plays no part in the actual decomposition of the $NO_x$ and oxidation of carbonaceous particulates.

PCT application WO98/09699, published after the priority date of this application, incorporates the subject matter of the application which resulted in U.S. Pat. No. 5,711,147. It discloses a further arrangement in which oxygen-rich exhaust gases are passed through a bed of an oxidising catalyst such as platinum-doped alumina in which $NO_x$ in the exhaust gases is oxidised to $NO_2$, hydrocarbons are mixed with the effluent from the oxidiser and the mixture is passed through a bed of a reducing catalyst such as γ-alumina in which the $NO_2$ and hydrocarbons are reduced to $N_2$, $CO_2$ and $H_2O$.

No plasma enhancement of the actions of the catalysts is involved in this arrangement.

Japanese published application J06-106025 discloses a system for the removal of nitrogenous oxides from the exhaust emissions from internal combustion engines in which unburnt hydrocarbons in the exhaust gases are subjected to a gas discharge in a gas permeable bed of catalytic material and appear to activate the catalytic material to catalyse the reduction of $NO_x$ in the exhaust gases to nitrogen. There is disclosed also the injection of a hydrocarbon into the exhaust gas stream to ensure that sufficient hydrocarbons are present to activate the catalytic material. Suitable catalytically active materials disclosed are $CO_3O_4$, $FE_2O_3$, $CµO$, $Al_2O_3$, $TiO_2$, $ZrO_2$, $ZnO$, $Y_2O_3$, $M_9O$, $Pt/SiO_2$, $SO_4/TiO_2$, $SO_4/ZlO_2$, $AlPO_4$, $NiSO_4/SiO_2$, $ZnCo_2/SiO_2$, and the mordenites known as H-ZSM-5, H—Y, H-Mordenite, Na ZSM-5 and Cu ZSM-5.

The reactor systems disclosed include an arrangement in which the exhaust gases are passed through sequential beds of catalytically active material, but it is to be noted that this is done to achieve an effective total depth of active material, because the materials quoted above have relatively low dielectric constants and therefore cannot sustain a plasma over an extended depth. There is no indication whatsoever of the use of different materials in the sequence of beds of active material, to perform different functions.

German specification DE 195 10 804A discloses a system for removing nitrogenous oxides from oxygen-rich exhaust gases from internal combustion engines in which a reducing agent is injected into an exhaust gas stream and a plasma is generated in the combination prior to its exposure to a catalyst the action of which is increased by reducing radicals created in the plasma.

Examples of reducing agents disclosed are: nitrogen or compounds thereof such as ammonia, hydrazine, cyanic acid, hydrocarbons or hydrogen. Examples of suitable catalysts disclosed are: copper or iron doped zeolites, platinum doped alumina, titania, lanthanides or mixtures thereof and doped mixtures of the oxides of tungsten, chromium or vanadium.

It is to be noted that the plasma is generated in the combined exhaust gases and reducing agent directly, without the presence of any agent which facilitates the excitation and activation of the reducing agent.

A paper 'Selective Catalytic Reduction of $NO_x$ with N-Free Reductants' by M. Shelef published in Chem Rev 1995 pp 209–225 is a comprehensive review of the use of zeolites in particular, in association with hydrocarbons for the reduction of the $NO_x$ content of internal combustion engine exhaust gases. Other catalysts are mentioned but not dealt with comprehensively. The paper is concerned solely with non-plasma assisted catalysis and is academic in nature, disclosing no practical systems.

While many candidate materials and compositions have been suggested for lean $NO_x$ catalysis in internal combustion engine vehicle applications, the zeolite family of materials are considered to offer the best opportunity for development of a commercial system. Synthetic zeolites are usually crystalline aluminosilicate materials with large surface area and channel structures with a well defined porosity. Several mechanisms have been proposed for the activity of the zeolites but at this time it is not clear that any single mechanism is responsible. Mechanisms believed to be operative include, but are not limited to; NO decomposition, partially oxidised hydrocarbon reactions with NO, formation and decomposition of organonitrogen species and bifunctional reactions involving activated hydrocarbons with $NO_2$. Further detailed analysis suggests possible roles of free radicals in these processes. The relative importance of different mechanisms appear to vary with many factors, including but not limited to; the zeolite, the exchanged metal or metals, the exchange level, the temperature and the composition of the gas containing the $NO_x$ to be reduced. While the exact mechanism may not be understood in detail for a given system it is the structure and surface activity of the zeolites which allow them to catalyse the lean $NO_x$ reactions.

One of the most significant factors limiting the commercial use of zeolites in lean $NO_x$ internal combustion engine vehicle catalysts has been their limited hydrothermal stability. The zeolites lose performance and irreversibly degrade at temperatures that would be required in most vehicle applications. The mechanisms for the loss of stability are again not completely clear and depend on the exchanged metal in the zeolite. Studies suggest that Cu doped ZSM-5, one of the more active zeolites degrades at higher temperatures by sintering and or decomposition and dealumination of the crystal lattice.

Recently it has been shown that introducing iron into the zeolite structure significantly increases the hydrothermal stability of the material. While understanding of the mechanisms for the promoted stability are not definitive it has been suggested that it is linked to the removal of certain catalytically active sites on the zeolite, in particular the Bronsted acid sites.

In order to be of practical use in a vehicle catalyst application the hydrothermally stabilised zeolite must have a high activity and selectivity for reduction of $NO_x$ to $N_2$ as this results in a high space velocity and low package size for the catalyst.

A non-thermal plasma, such as is described in GB patent 2,274,412 and more particularly as described herein, can be engineered to produce many of the active species that are implicated in lean $NO_x$ catalysis over zeolites and described previously. In particular hydrocarbons can be activated as well as partially oxygenated and NO can be converted to $NO_2$, all functions that have been proposed to occur on zeolite active sites and hence potentially inhibited in hydrothermally stabilised zeolites.

Based on these observations and current understanding of the structure of hydrothermally stable zeolites, in particular the corresponding removal of catalytically active sites, it is an appreciation upon which the present invention is based that the synergistic interaction of a plasma and a catalyst is key to the realisation of a commercially viable lean $NO_x$ aftertreatment system for internal combustion engine vehicle applications.

It can be seen from the above that there are many approaches to solving the problem of reducing the amount of nitrogenous oxides emitted by internal combustion engines and that a number of these processes involve the addition of reducing agents to the exhaust gases.

The present invention seems to provide a different approach to solving the still outstanding problem of how to reduce the amount of nitrogenousoxides emitted by the ever increasing number of internal combustion engines in use.

It is an object of the present invention to provide an improved method for the removal of carbonaceous particulates and nitrogenous oxides from the exhaust gases emitted by internal combustion engines.

According to the present invention there is provided a method of treating a gaseous medium including nitrogenous oxides to remove the nitrogenous oxides therefrom, characterised in that there is included the operations of oxidatively activating a gaseous hydrocarbon by generating an electric discharge in the gaseous hydrocarbon in the presence of a gas permeable first material adapted to have oxidative properties in the presence of a non-thermal plasma and contacting a combination of the activated hydrocarbon and gaseous medium with a second material adapted in the presence of the activated hydrocarbon to catalyse the reduction of the nitrogenous oxides in the gaseous medium to nitrogen.

By plasma activated hydrocarbon we mean hydrocarbon the activity of which has been enhanced in a plasma by for example partial oxidation, free radical formation, ionisation and/or energy absorption (eg. into vibrational or rotational modes).

Also according to the present invention there is provided a reactor system for the plasma assisted treatment of a gaseous medium to remove nitrogenous oxides therefrom characterised in that there is included a gas permeable body (411) including a first material (412) adapted in the presence of a non-thermal plasma to activate oxidatively a gaseous hydrocarbon passing therethrough, a gas permeable body including a second material (412) adapted in the presence of an oxidatively activated hydrocarbon to catalyse the reduction to nitrogen of nitrogenous oxides contained in the gaseous medium and means for applying to the first material a potential sufficient to excite an electric discharge in a gaseous hydrocarbon passing through the body (411) of the first material.

Also according to the invention there is provided a reactor system for the treatment of a gaseous medium including nitrogenous oxides, characterised in that there is provided a source of a gaseous hydrocarbon, a reactor to which the source of the gaseous hydrocarbon is connected, the reactor containing a gas permeable bed of a material adapted to have oxidative properties in the presence of a plasma, a second reactor including a material adapted in the presence of plasma activated hydrocarbons to catalyse the reduction of nitrogenous oxides to nitrogen, and means for combining plasma activated hydrocarbons from the reactor with the gaseous medium prior to the combination passing into the reactor.

Examples of suitable active materials for the reactors are the aluminas known as Alcoa LD-350, Catal Industrial CT-530, Condea Hollow Extrudates, DYPAC, T-60 Alumina, Cordierite, $\alpha$, $\chi$ and $\gamma$ Aluminas and Aluminas containing mixtures of these phases (including tabular, fused and activated aluminas) Cu-doped DYPAC, glass beads, Fecralloy, Silica Gels and other water absorbing materials, P2 graded foams, and Puremet foams, ferroelectric, dielectrics, ceramics, silicas, polymers. These materials may be coated with various washcoats including zeolites, $V_2O_5$, $V_2O_5$/Pt coats and a coating derived from an aqueous dispersion of flame hydrolysed alumina powder. There is also scope for the use of current state of the art automotive catalysts in monolithic, pelletised and foam forms. Preferred materials for the active element are zeolites, in particular, zeolites containing iron, cobalt or copper with or without additional catalyst promoting cations such as cerium and lanthanum.

Materials with a photocatalytic effect such as titanium dioxide some or all of which is in the anatase form; or cerium dioxide are suitable as they are activated by the ultra-violet light generated in the electrical discharge.

The form of the active material is desirably such as to provide high exposed surface area for maximising available reaction sites per unit volume for gas passing through the reactor. The active material may have open porosity such that it is itself permeable to gas.

These materials may be of use in the following forms or as washcoats applied to the following forms: beads, foams, honeycomb monoliths, extrudates of single or mixed oxides, wires, wire wools, weaves, bobbins, bonded or pressed sheets, discs and rolls. The honeycombs may be used in a variety of different geometries including a cordierite one in which its channels are alternately open and closed so that the combustion exhaust gas passes through the porous walls of the honeycomb. For ease of production and durability, aluminium metal may be used, provided, by anodising, with an alumina surface layer.

The reactor bed may be made of a mixture of materials, one of which has a high dielectric constant, and preferably is ferroelectric, and the other of which, while also dielectric is chosen for its catalytic activity with respect to the reduction of oxides of nitrogen.

In one arrangement the reactor chamber has two sections in one of which there are pellets of a ferroelectric material having a high dielectric constant and in the other of which there is the active material adapted to catalyse the reduction of nitrogenous oxides in the exhaust gases to nitrogen, the arrangement being such that the exhaust gases pass through the pellets of ferroelectric material before the active material.

Figure 3:
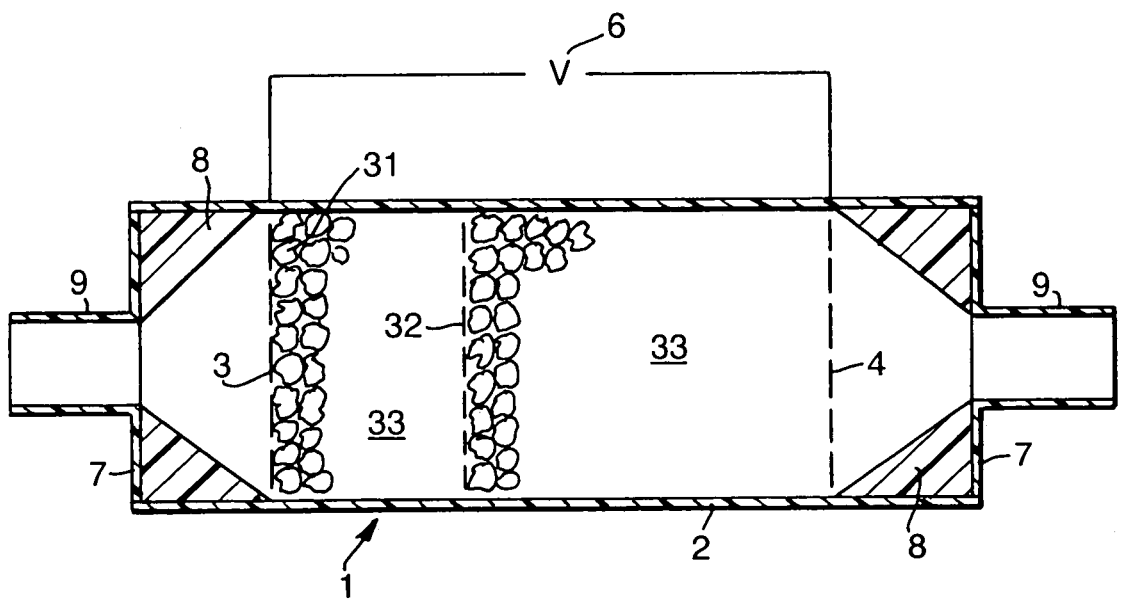
Figure 2A:
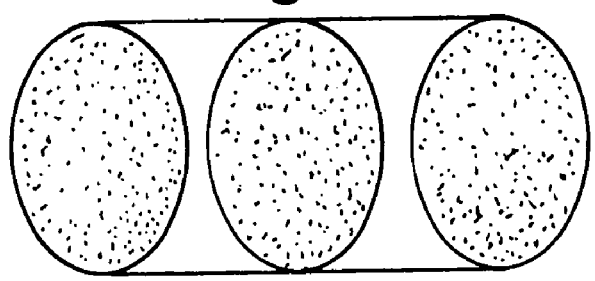
Figure 2B:
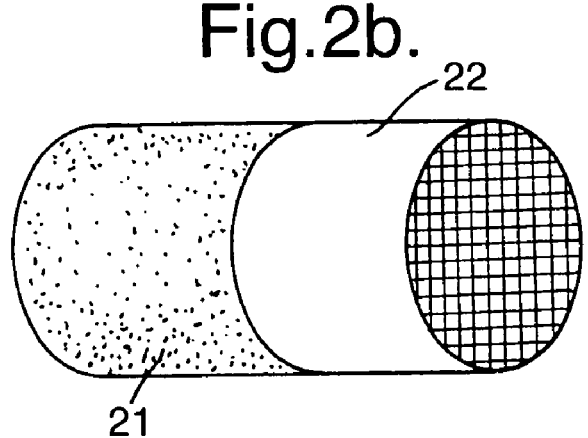
Figure 2C:
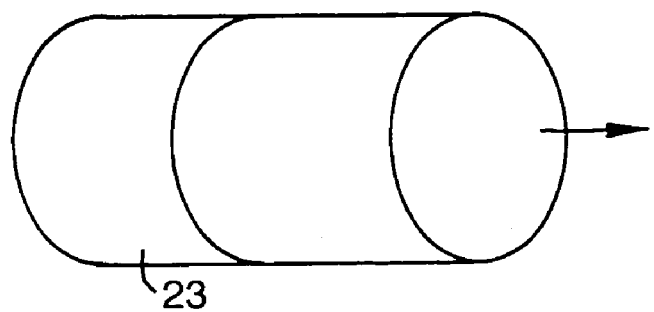
Figure 4:
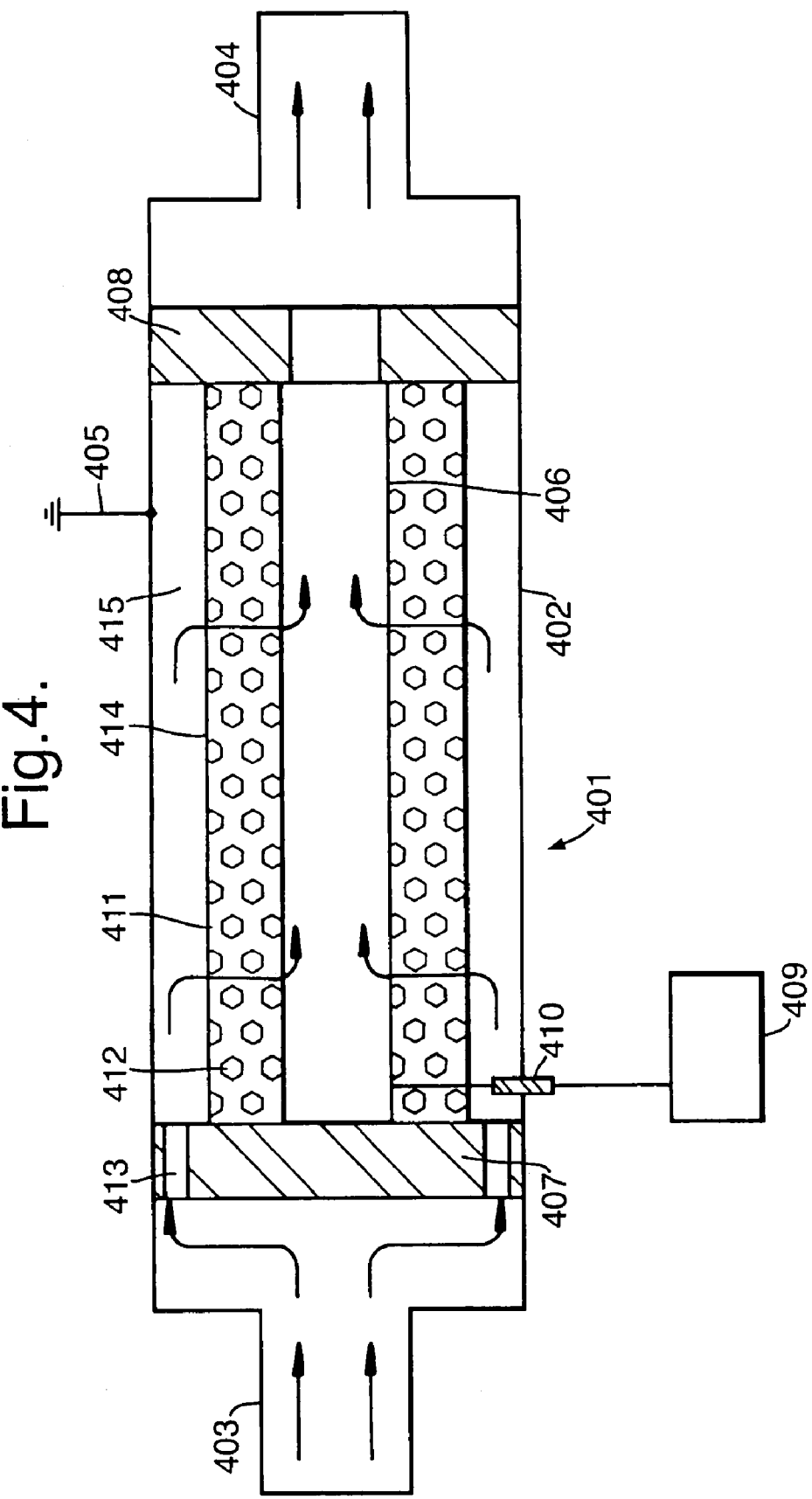
Figure 5:
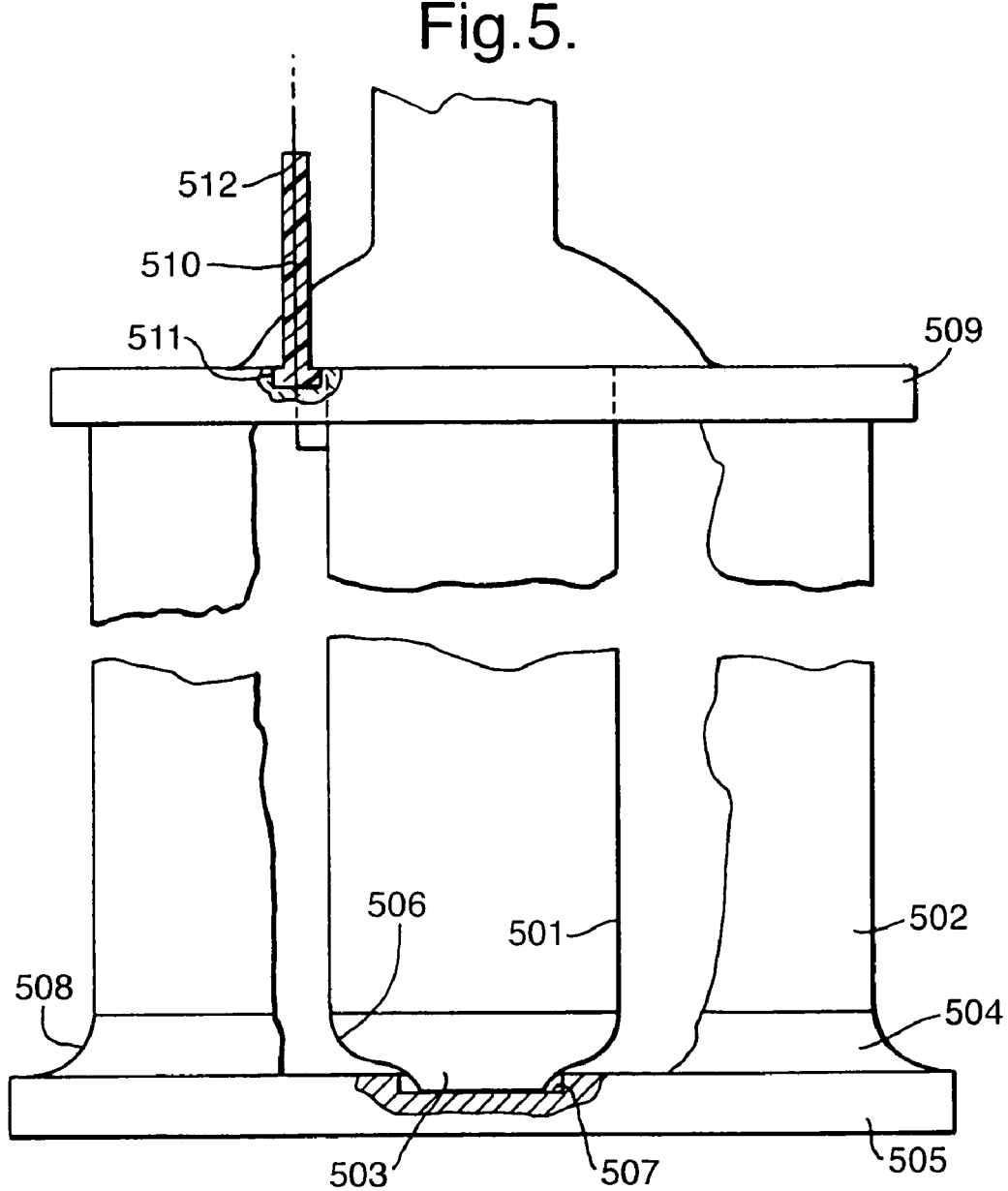
Figure 6:
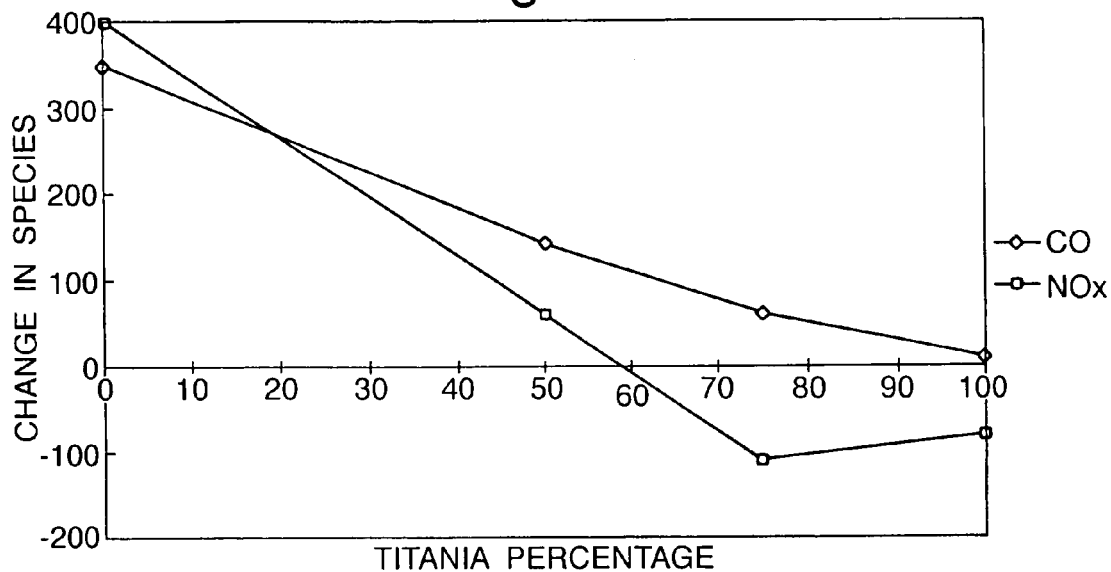
Figure 7:
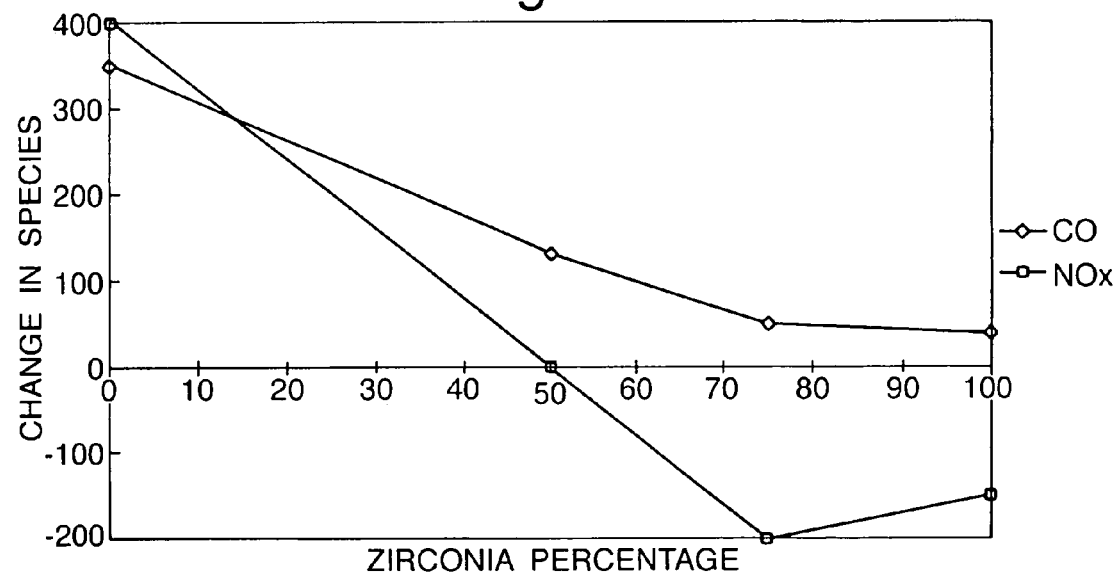

The invention will now be described, by way of example, with reference to the accompanying drawings, in which FIG. 1 shows, schematically, a cross-section of an embodiment of the invention, in which exhaust gases from an internal combustion engine are arranged to flow axially through a bed of catalytically active gas permeable material;

FIG. 2(a) to (c) show, schematically, different arrangements of catalytically active material embodying the invention;

FIG. 3 shows, schematically, a second embodiment of the invention;

FIG. 4 shows schematically a third embodiment of the invention in which the exhaust gases are arranged to flow radially through a bed of catalytically active material, FIG. 5 shows schematically a second form of radial flow reactor embodying the invention, FIG. 6 shows how the concentration of carbon monoxide and $NO_x$ in the effluent from a reactor embodying the invention and having a reactor bed including a mixture of pellets of barium titanate and zirconia varies with the percentage of zirconia in the mixture, and FIG. 7 shows how the concentration of carbon monoxide and $NO_x$ in the effluent from a reactor embodying the invention and having a reactor bed including a mixture of pellets of barium titanate and titania varies with the percentage of titania in the mixture.

Figure 8A:
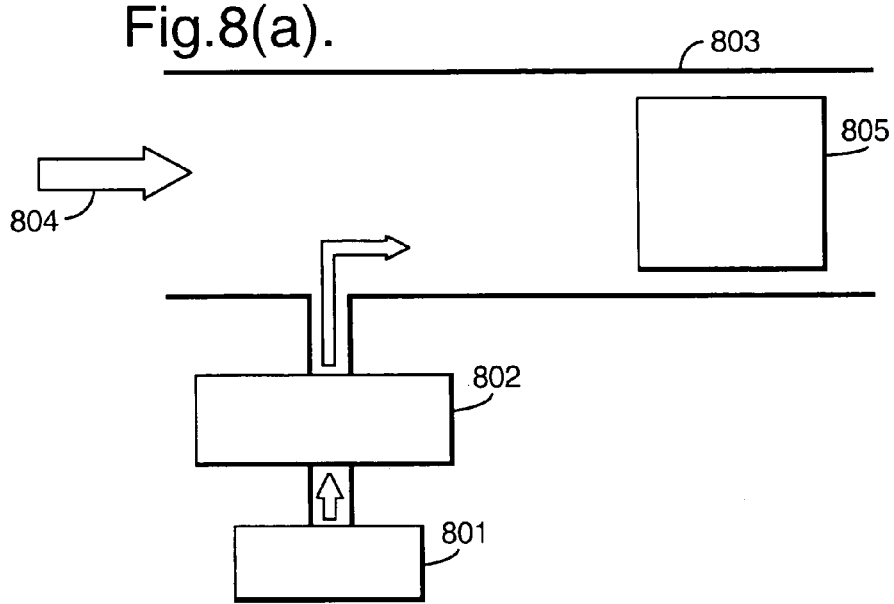
Figure 8B:
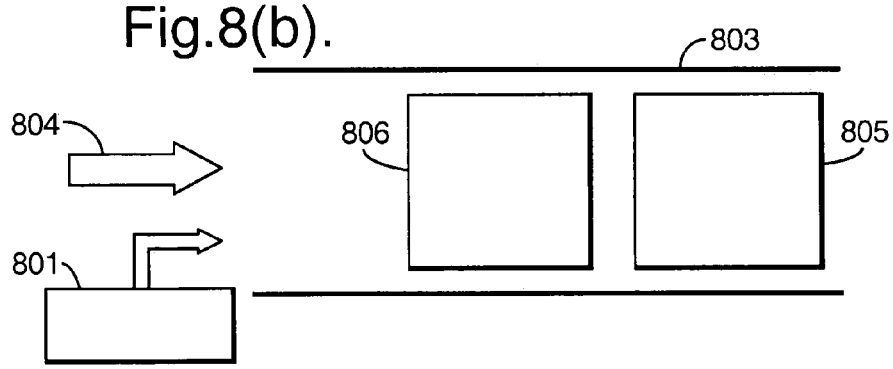
Figure 8C:
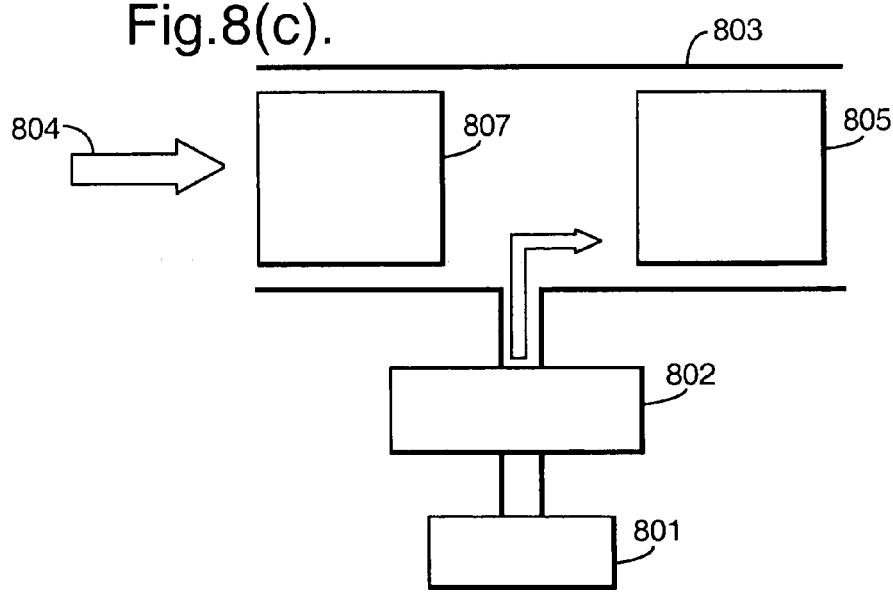

FIGS. 8a, 8b and 8c show conceptual flow diagrams of embodiments of the invention in which additional hydrocarbons are added to exhaust gases from internal combustion engines.

Referring to FIG. 1, a plasma reactor 1 for particulate and other combustion products and simultaneously controlling or removing $NO_x$ from the exhaust of an internal combustion engine consists of a chamber 2 made of an insulating refractory material, in which there are two metallic grids 3 and 4, respectively. Between the grids 3 and 4 there is a loosely packed reactor bed 5 of a particulate reactor material which, in the presence of an electric field which is sufficient to establish a plasma in an internal combustion engine exhaust gas flowing through the reactor bed 5 of the reactor 1, is capable of causing the reduction of nitrogen oxides in the exhaust gas to nitrogen. The grids 3 and 4 are connected to an AC power supply 6 capable of charging the particulate material in the reactor bed 5 to a potential sufficient to excite the exhaust gases to a plasma state. Between each of the grids 3 and 4 and the adjacent end walls 7 of the reactor chamber 2 are conical gas flow smoothers 8. Again, these are made of an insulating material. Stubs 9 forming part of the end walls 7 of the reactor chamber 1 enable it to be coupled into an exhaust system of an internal combustion engine, neither of which is shown in the FIG. 1.

Suitable materials for the reactor bed 5 of particulate material are beads of γ-alumina, and/or silica either as such or doped-with alkali metals, alkaline earths or metals with catalytic properties such as the transition and noble metals. Zeolites also can be used, particularly if they contain iron, copper or cobalt with or without additional catalyst promoting cations such as cerium and lanthanum. Pellets of the alumina/silica based materials and zeolites are effective in bead form. Zeolite pellets are also effective in the form of short tubes.

Suitable potentials are of the order of tens of kilovolts.

In use, the high potential applied across the electrodes 4 and 3 is such as to excite a non-thermal plasma in the exhaust gases in the interstices between the pellets 5. A convenient potential for this purpose is a potential of about 10 kV to 30 kV which may be regularly pulsed direct potential or a continuously varying alternating potential, or may be an interrupted continuous direct potential.

Anatase phase titania is suitable for the removal of particulate carbon and nitrogenous oxides from diesel and other internal combustion engine exhaust gases because anatase titania has photocatalytic properties in the presence of ultraviolet radiation, and such radiation is generated by the plasma discharges within the interstices of the reactor beds of reactors such as those described. The ultraviolet radiation excites electrons from the valence to the conduction band of the titanium atom. This excitation results in the formation of holes at the positions in the crystal lattice of the titanium atoms and free electrons. The free electrons cause reduction reactions to occur and the holes cause oxidation reactions to occur, both of which facilitate the removal of carbonaceous and nitrogenous combustion products from internal combustion engine exhaust gases.

Particularly suitable for use for the above purpose are anatase phase titania pellets manufactured by the Norton Chemical Process Products Corporation and marketed under their product code number XT 25376. These pellets contain 99% by weight titania and 0.1% by weight of $SO_4$. These pellets have a nominal surface area of 139 $m^2g^{-1}$, a median pore diameter of 16 nm, a total pore volume of 0.38 $cm^3g^{-1}$, and a density of 0.836 g $cm^{-1}$. This material has the property that it does not adsorb water from the vapour phase, which is advantageous in connection with the treatment of internal combustion engine exhaust gases.

In the structured rutile phase, the permittivity ϵ of titania is anisotropic, and higher than the permittivity of isotropic titania phases (i.e. phases which do not contain structured rutile phase). This isotropic titania has a permittivity of the order of 15 whereas for structured rutile phases quoted values are $\epsilon_{11}=86$, $\epsilon^{22}=86$ and $\epsilon_{33}=170$ for measurement at 300 K and $10^4$–$10^6$Hz. High permittivity is beneficial for generating a non-thermal plasma, so if structured rutile phase is present improved performance can be anticipated.

Zirconia in some forms also has catalytic properties for the reduction of nitrogenous oxides. One such form of zirconia is that manufactured by Norton Chemical Process Products Corporation and marketed under their product code XZ 16052. In pellet form this material has a nominal surface area of 95 $m^2g^{-1}$, a pore volume of 0.31 $cm^3g^{-1}$ and a density of 1.17 g $cm^-$. This form of zirconia has the property that it does not adsorb water from the vapour phase. It also has a bimodal pore structure with the respective pore diameters centred around 40 nm and 8 nm.

Further, when pellets of zirconia in this form are mixed in the gas permeable reactor bed with pellets of anatase titania there is a symbiotic improvement in performance in the treatment of internal combustion engine exhaust gases as compared with the performance of the zirconia or anatase titania on their own. It is convenient for this purpose to provide equal parts by volume of titania and zirconia in the mixture.

The gas permeable reactor bed is not restricted to a single substrate packing or shape. The material of the reactor bed may be in the form of a graded pelletised bed or graded porosity foam. For example the inlet side to the foam could have a relatively large pore size which decreases through the length of the bed, as shown in FIG. 2(a). This helps to reduce asymmetric soot deposition in the bed as the soot penetrates deeper and more uniformly into the substrate reducing the possibility of degrading the uniformity of the electric field distribution between the electrodes.

The gas permeable bed may have a mixed structure, for example, a foam section 21, followed by a honeycomb section 22, as shown in FIG. 2(b), preferably arranged so that incoming exhaust gases impinge on the foam region 21, which has the effect of dispersing the exhaust flow. The foam region 21 of the bed then acts as both an emissions reducer and a flow distributor, sending the gas evenly through the honeycomb section 22.

Significant water absorption with some of the bed materials has been observed for the bed of active material and this must be taken into account in the selection criteria. One solution may be to bleed air into the gas stream which could dilute the exhaust gas and may then help prevent sooting up and water absorption.

Alternatively, one can have a mixed bed which consists of layers of silica gel 23 (or activated carbon or any suitable material with capability of drying the gas) upstream of the active material as shown in FIG. 2(c). If the exhaust is flowed through the drying bed, first, on cold start the water is removed from the exhaust gas allowing the active material to treat dry gas. As the exhaust heats up a thermal switch (not shown) cuts in, redirecting the flow across the active material only, where $NO_x$ particulate material reduction takes place. The heat of the exhaust gas can be used to recondition the water absorbing bed, so that when the temperature drops or water becomes a problem, exhaust gas flow can be switched back initially through the silica gel layers 23. Condensate forming after use and cooling of the converter would be absorbed by the silica gel 23 or activated carbon, which is then reconditioned as the exhaust gas warms up the bed of active material, on the next use of the internal combustion engine to which the reactor is fitted.

The reactor bed 5, as shown in FIG. 1, may include also, pellets of high dielectric constant active materials such as those described in our earlier patent GB 2,274,412 which are effective for the removal of carbonaceous contaminants from internal combustion engine exhaust gases. A preferred material for this purpose is barium titanate. Calcium titanate is a suitable alternative.

If these materials are used, then although they can be mixed with the nitrogenous oxide reducing material, it is possible for the two to be kept separate, with the high dielectric constant material pellets being upstream of the other material, as shown in FIG. 3, in which those components which are common to both embodiments of the invention have the same reference numerals.

Referring to FIG. 3, a body 31 of pellets of a high dielectric constant ceramic material such as barium titanate, is situated upstream of the bed 5 material capable of reducing nitrogenous oxides contained in internal combustion engine exhaust gases and separated from it by a metal grid 32, so as to form a combined reactor bed 33. A voltage sufficient to excite into a plasma state exhaust gases passing through the reactor is applied across the combined reactor bed 33.

In a variant of this system the plasma exciting voltage is applied across the pellets 31 of barium titanate only. The reaction products in the plasma from the bed of pellets 31 of barium titanate pass into the nitrogenous oxide reducing portion of the reactor bed 33 where they are reduced to primarily nitrogen.

Referring to FIG. 4, a reactor 401 for the treatment of internal combustion engine exhaust gases to reduce emissions of pollutants such as carbonaceous and nitrogenous combustion products therefrom consists of a stainless steel reactor chamber 402 which has an inlet stub 403 and an outlet stub 404, by means of which it can be connected into the exhaust system of an internal combustion engine (not shown). The chamber 402 is arranged in use to be connected to an earthing point 405. Within the chamber 402 are a cylindrical inner electrode 406 made of perforated stainless steel sheet and an earthed outer electrode 414 co-axial with the inner electrode 406 and also made of perforated stainless steel sheet. The electrodes 406 and 414 are held in position by two insulating supports 407 and 408. The space 411 between the electrodes 406 and 414 and the supports 407 and 408 is filled with a reactor bed 411 of pellets illustrated highly diagrammatically at 412 made of barium titanate and titania or zirconia or a mixture as discussed further below. The upstream electrode support 407 has a number of regularly spaced axially-oriented holes 413 around its periphery so that exhaust gases entering the reactor 401 pass into the space 415 between the outer electrode 414 and the wall of the chamber 402 before passing radially through the bed of pellets 412 and leaving the reactor 401 via the inner electrode 406, as shown in the drawing. An insulated feed-through 410 connects output from a source 409 of electrical potential to the inner electrode 406. The potential thus applied across the reactor bed 411 is sufficient to excite a plasma within the interstices between the pellets 412 of the reactor bed 411. A convenient potential for this purpose is about 10 kV to 30 kV, and may be a pulsed direct or continuously varying alternating potential, or may be an interrupted continuous direct potential.

Referring to FIG. 5 there is shown in part section the mesh electrode assembly of a radial flow reactor chamber similar to that described in our earlier patent GB 2 214 142 with reference to FIG. 2.

Inner and outer mesh electrodes 501, 502, respectively terminate in ceramic end pieces 503, 504, respectively, which abut a ceramic end flange 505. The end-piece 503 of the inner mesh electrode 501 has an inward flare 506 and is located in a recess 507 in the end flange 505 and the outer edge of the end-piece 504 has a flare 508. The flares 506 and 508 of the end-pieces 503, 504, respectively, increase the length of possible leakage paths from the ends of the mesh electrodes 501, 502, so reducing the possibility of arcing from the mesh electrodes 501, 502. As with the axial-flow reactor chamber, the bed of active material can be particulate with the size of the particles being graded, made of different types of material or have a drying layer of silica gel or activated carbon or other suitable water absorbing material, but in this case, the variations in the material of the bed occur in a radial sense. The other ends of the inner and outer electrodes 501, 502 are located in another ceramic flange 509, which has an axial passage for the exhaust gases being treated. The flange 509 has a feed-through 510 for a high voltage power supply, not shown, to the inner electrode 501. A recess 511 in the flange 509 enables the insulation 512 as feed-through 510 to abut accurately the flange 509, so reducing the risk of electrical leakage.

The two-section arrangement of the reactor bed described with reference to FIG. 2 also can be used in the radial-flow arrangements described with reference to FIGS. 4 and 5, the grid 22 being replaced by a suitably disposed cylindrical grid.

In all embodiments of the invention the applied voltage can be either AC or DC, and if DC it can be in pulsed form. In the case of AC or pulsed DC applied voltages, it is believed that in certain circumstances it is advantageous for the voltage rise time to be as short as is practicable.

Although the invention is effective with applied voltages in the range 15 to 30 kV and frequencies in the range 50 Hz to 15 KHz, higher frequencies can confer advantages, for example, frequencies of the order of tens of Khz appear to allow more efficient transfer of electrical energy into the exhaust gases, and the faster rise time of the voltage peaks can yield more efficient energy release into the plasma.

It is an advantage if the nitrogenous oxide reducing materials used for the reactor beds subjected to an electrical discharge in the various embodiments described have negative coefficients of resistance as in this case as the bed 5 heats up to its normal operating temperature the amount of power absorbed by the bed 4 of reactor material will decrease.

Certain materials capable of catalysing the reduction of $NO_x$ to $N_2$ act also as a trap for $NO_x$ which can be removed and reduced by periodically raising the temperature. Where such materials are used in the embodiments of the present invention, it is possible to effect removal and reduction of trapped $NO_x$ by periodic or continuous application of the electric discharge. It is thus possible to provide either a combined bed which traps both particulate matter and $NO_x$ with periodic or continuous application of appropriate electric discharge.

At least some of the electrical energy required to power the source of the plasma-generating voltages can be generated by means of thermo-electric devices arranged to be exposed to the heat of the exhaust gases.

In use, particularly if beds of non-conducting active material are used, variations in the electric field gradient can occur, which may lead to localised arcing within the reactor bed. This phenomenon can be reduced by inserting sheets of electrically conducting, preferably gas permeable, material at intervals throughout the active bed and allowing these intermediate electrodes to "float" in terms of electric potential. If the reactor is of the axial flow type, then the intermediate electrodes can take the form of a number of parallel disks; if the reactor is of the radial flow type then the intermediate electrodes can take the form of a number of co-axial cylinders.

It is to be noted that, whether the reactor is of the axial or radial flow type, the cross-section of the reactor does not have to be circular. As with conventional silencers, the reactors can have elliptical cross-sections.

As the creation of plasma is more efficient at lower pressures, steps can be taken to reduce the gas pressure within the reactor chamber compared with the remainder of the exhaust system. One way of doing this is to provide an expansion chamber at the inlet end of the reactor and to increase the diameter of the outlet from the reactor chamber.

Laboratory results obtained using a reactor chamber as described in FIG. 1 for some of the above materials are given in the following examples:

EXAMPLE 1

Activated Alumina Beads (γ-Alumina) (LD-350, 4 mm, Alcoa)

| Material | | $NO_x$ (ppm) | NO (ppm) | $NO_2$ (ppm) | CO (ppm) | $CO_2$ (%) | THC (ppm) |
|---|---|---|---|---|---|---|---|
| LD-350 | Blank/Bypass | 323 ± 2 | 243 ± 2 | 81 ± 4 | 763 ± 10 | 3.69 ± 0.02 | 627 ± 145 |
| | Bed Voltage 18 kV | 127 ± 21 | 30 ± 3 | 97 ± 18 | 808 ± 5 | 3.69 ± 0.04 | 355 ± 13 |

(THC = Total Hydrocarbon Content)

EXAMPLE 2

Activated Alumina Beads (γ-Alumina) (CT530 4 mm, CATAL International)

| Material | | $NO_x$ (ppm) | NO (ppm) | $NO_2$ (ppm) | CO (ppm) | $CO_2$ (%) | THC (ppm) |
|---|---|---|---|---|---|---|---|
| CT 530 | Blank/Bypass | 325 ± 4 | 246 ± 3 | 80 ± 3 | 805 ± 10 | 3.78 ± 0.02 | 570 ± 159 |
| | Bed Voltage 18 kV | 91 ± 20 | 23 ± 4 | 68 ± 16 | 877 ± 5 | 3.74 ± 0.02 | 270 ± 10 |

EXAMPLE 3

Alumina (Activated) from Condea-Chemie

| Material | | $NO_x$ (ppm) | NO (ppm) | $NO_2$ (ppm) | CO (ppm) | $CO_2$ (%) | THC (ppm) |
|---|---|---|---|---|---|---|---|
| Condea Hollow | Blank/Bypass | 304 ± 1 | 235 ± 1 | 69 ± 1 | 775 ± 6 | 3.72 ± 0.01 | 790 ± 47 |
| | Bed Voltage 18 Kv | 99 ± 18 | 34 ± 3 | 65 ± 17 | 787 ± 6 | 3.68 ± 0.03 | 423 ± 12 |

Table 1, below, and FIG. 6 show how, in a radial flow reactor such as that described with reference to FIG. 1 and using a reactor bed consisting of a mixture of pellets of barium titanate and titania, the concentration of $NO_x$ and carbon monoxide change for different operating voltages and barium titanate/titania mixtures.

TABLE I

Changes in CO and $NO_x$ as a function of titania percentage and voltage in a axial flow pellet bed reactor

| Titania (%) | Barium Titanate (%) | Change in CO (ppm) | Change in $NO_x$ (ppm) | Voltage (kV) |
|---|---|---|---|---|
| 100 | 0 | 0+ | −35 | 0 |
|  |  | 10 | −60 | 16.0 |
|  |  | +10 | −80 | 17.7 |
| 75 | 25 | 0 | −40 | 0 |
|  |  | +10 | −50 | 10.6 |
|  |  | +25 | −60 | 12.4 |
|  |  | +35 | −80 | 14.4 |
|  |  | +60 | −110 | 16.0 |
| 50 | 50 | 0 | −30 | 0 |
|  |  | +10 | −35 | 8.8 |
|  |  | +20 | −40 | 10.6 |
|  |  | +70 | −10 | 12.4 |
|  |  | +120 | +30 | 14.1 |
|  |  | +140 | +60 | 16.0 |
| 25 | 75 | 0 | −25 | 0 |
|  |  | +70 | +50 | 15.0 |
| 0 | 100 | 0 | 0 | 0 |
|  |  | +20 | +40 | 5.3 |
|  |  | +50 | +70 | 7.1 |
|  |  | +100 | +120 | 8.8 |
|  |  | +105 | +200 | 10.6 |
|  |  | +220 | +290 | 12.4 |
|  |  | +310 | +350 | 14.1 |
|  |  | +350 | +400 | 16.0 |

The highly oxidative effect of the barium titanate in these examples (as may be seen from the 100% barium titanate example) is the consequence of the use of a particular form and preparation of the barium titanate and the bed configuration of the apparatus used in generating these results.

It can be seen from FIG. 6 that the most effective range of mixtures of barium titanate and titania both in respect of reducing $NO_x$ and removing carbonaceous constituents of vehicle exhaust gases, is between 20 and 80 percent of titania.

Table II and FIG. 7 show similar results for mixtures of barium titanate and zirconia. Again, a most effective range of 20%–80% zirconia occurs, with a 50/50 mixture being optimum.

TABLE II

Changes in CO and $NO_x$ as a function of zirconia percentage and voltage in the pellet bed reactor

| Zirconia (%) | Barium Titanate (%) | Change in CO (ppm) | Change in $NO_x$ (ppm) | Voltage (kV) |
|---|---|---|---|---|
| 100 | 0 | 0 | −100 | 0 |
|  |  | +40 | −150 | 16.0 |
| 75 | 25 | 0 | −140 | 0 |
|  |  | +50 | −200 | 16.0 |
| 50 | 50 | 0 | −100 | 0 |
|  |  | +100 | −30 | 14.1 |
|  |  | +130 | 0 | 16.0 |
| 25 | 75 | 0 | −50 | 0 |
|  |  | +80 | +30 | 14.1 |
| 0 | 100 | 0 | 0 | 0 |
|  |  | +20 | +40 | 5.3 |
|  |  | +50 | +70 | 7.1 |
|  |  | +100 | +120 | 8.8 |
|  |  | +150 | +200 | 10.6 |
|  |  | +220 | +290 | 12.4 |
|  |  | +310 | +350 | 14.1 |
|  |  | +350 | +400 | 16.0 |

FIGS. 8(*a*) to 8(*c*) show three embodiments of the invention in which a hydrocarbon is added to exhaust gases from an internal combustion engine. Common features have the same reference numerals.

Referring to FIG. 8(*a*) a hydrocarbon, which may be the same fuel as is used in an internal combustion engine from the exhaust gases of which nitrogenous oxides and carbonaceous particulates are to be removed, or another hydrocarbon such as propene is passed from a source 801 through a plasma activated pellet bed reactor 802, such as those described with reference to FIGS. 1 or 4 above, and the plasma activated hydrocarbon output from the reactor 802 is injected into a duct 803 through which the exhaust gases, indicated by the arrow 804 are flowing. The mixture is then passed through, or over, a bed 805 of a reducing catalyst such as the zeolite known as H-ZSM-5 or the zeolite known as mordenite, which have $SiO_2/Al_2O_3$ molar ratios of 51 and 35 respectively. The zeolites may include ions of catalytically active metals such as iron, cobalt or copper with or without additional catalyst promoting cations such as cerium or lanthanum.

The catalyst bed 805 may include electrodes (not shown) so that a plasma can be created within its interstices, as in the case of the reactor 802, particularly if the reducing catalyst is in the form of beads or pellets of extrudate.

The pellet bed reactor 802 at least partially activates the hydrocarbons passing through it. These plasma activated hydrocarbons then react with the $NO_x$ in the exhaust gases in the presence of the catalyst to produce $N_2$ and other benign products such as water.

FIG. 8(*b*) shows a system in which the hydrocarbon 801 is combined with the exhaust gases 804 before passing into a two-stage reactor such as those described with reference to FIGS. 2, or in the unillustrated modification of the FIG. 4 embodiment, in which there is a plasma activated oxidising bed (806) of $BaTiO_3$ pellets followed by a bed (805) of reducing catalyst adapted to reduce nitrogenous oxides to nitrogen and water, as before. Again, appropriate catalysts for the bed (805) are zeolites such as those mentioned above, in bead, extrudate, foam or monolithic form.

FIG. 8(*c*) shows a system in which the arrangement of FIG. 8(*a*) is combined with a second plasma enhanced pellet bed reactor (807) such as that described with reference to FIG. 1 or FIG. 4, through which the exhaust gases (804) are passed before the plasma activated hydrocarbons from the reactor 802 are injected into them. As with the FIG. 8(*a*) embodiment, the reducing catalyst may be in the form of beads, extrudates, foams or monoliths of zeolites.

Although not illustrated, another version of the FIGS. 8(*a*) 8(*b*) and 8(*c*) embodiments uses a mixed bed of oxidising, plasma supporting high dielectric or ferroelectric material mixed with the reducing catalyst(805).This is preferred when the catalyst bed (805) is required to sustain a plasma.

An advantage of the systems described above is that the source of the hydrocarbons can be the same fuel as is used in the internal combustion engine, so that there is no need to provide separate storage and supply systems, nor the need to ensure the availability of other materials.

The invention is not restricted to the details of the foregoing examples. For instance, the reactor system or the method of the invention may utilise a reactor bed and power supply configuration as described in our patent application PCT/GB98/02061 filed 13 Jul. 1998, publication no. 99/05400.

The invention claimed is:

1. A method of treating a gaseous medium including nitrogenous oxides to remove the nitrogenous oxides therefrom, which method comprises the operations of activating a gaseous hydrocarbon for achieving partial oxidation by generating an electric discharge in the gaseous hydrocarbon in the presence of a gas permeable first material which has oxidative properties in the presence of a non-thermal plasma and contacting a combination of the activated hydrocarbon and gaseous medium with a second material adapted in the presence of the activated hydrocarbon to catalyze the reduction of the nitrogenous oxides in the gaseous medium to nitrogen, wherein the second material is a mixture of equal parts by weight of anatase phase titania and zirconia.

2. A reactor system for the plasma assisted treatment of a gaseous medium to remove nitrogenous oxides therefrom, which system comprises a gas permeable body including a first material adapted in the presence of a non-thermal plasma to activate, for partially oxidizing, a gaseous hydrocarbon passing therethrough, a gas permeable body including a second material adapted in the presence of an activated hydrocarbon for catalyzing the reduction to nitrogen of nitrogenous oxides contained in the gaseous medium and means for applying to the first material a potential sufficient to excite an electric discharge in a gaseous hydrocarbon passing through the said body including the first material; a source of a gaseous hydrocarbon, a first reactor to which the source of hydrocarbon is connected, said first reactor containing a gas permeable bed of the first material and means for establishing an electric discharge in the gaseous hydrocarbon in the interstices in the bed of the first material, a second reactor including a gas permeable bed of the second material and means for combining plasma activated hydrocarbon from said first reactor with the gaseous medium from which nitrogenous oxides are to be removed prior to the combination passing into the said second reactor; wherein there is included a further reactor through which the gaseous medium from which nitrogenous oxides are to be removed is passed prior to the combination of the plasma activated hydrocarbons therewith, said further reactor also including a gas permeable bed of the first material and means for establishing an electrical discharge in the gaseous medium in the interstices of the bed of first material in said further reactor thereby to effect the oxidation of particulate carbonaceous material in the gaseous medium.

3. A reactor system for the plasma assisted treatment of a gaseous medium to remove nitrogenous oxides therefrom, which system comprises a gas permeable body including a first material adapted in the presence of a non-thermal plasma to activate, for partially oxidizing a gaseous hydrocarbon passing therethrough, a gas permeable body including a second material adapted in the presence of an activated hydrocarbon for catalyzing the reduction to nitrogen of nitrogenous oxides contained in the gaseous medium and means for applying to the first material a potential sufficient to excite an electric discharge in a gaseous hydrocarbon passing through the said body including the first material; wherein the second material is a mixture of equal parts by volume of anatase phase titania and zirconia.

4. A reactor system for the plasma assisted treatment of a gaseous medium for removing nitrogenous oxides therefrom, which system comprises a gas permeable body including a first material adapted in the presence of a non-thermal plasma to activate oxidatively a gaseous hydrocarbon passing therethrough, a gas permeable body including a second material adapted in the presence of an oxidatively activated hydrocarbon to catalyze the reduction to nitrogen of nitrogenous oxides contained in the gaseous medium and means for applying to the first material a potential sufficient to excite an electric discharge in a gaseous hydrocarbon passing through the said body including the first material; wherein there is provided a source of a gaseous hydrocarbon, a first reactor to which the source of hydrocarbon is connected, sad first reactor containing a gas permeable bed of the first material and means for establishing an electric discharge in the gaseous hydrocarbon in the interstices in the bed of the first material, a second reactor including a gas permeable bed of the second material and means for combining plasma activated hydrocarbon from said first reactor with the gaseous medium from which nitrogenous oxides are to be removed prior to the combination passing into the said second reactor; wherein there is included a further reactor through which the gaseous medium from which nitrogenous oxides are to be removed is passed prior to the combination of the plasma activated hydrocarbons therewith, said further reactor also including a gas permeable bed of the first material and means for establishing an electrical discharge in the gaseous medium in the interstices of the bed of first material in said further reactor thereby to effect the oxidation of particulate carbonaceous material in the gaseous medium.

* * * * *